(12) United States Patent
Valine

(10) Patent No.: US 9,584,519 B2
(45) Date of Patent: *Feb. 28, 2017

(54) APPARATUS, AND ASSOCIATED METHOD, FOR CONTROLLING CONNECTIVITY OF A COMPUTER DEVICE WITH A COMPUTER NETWORK

(71) Applicant: HEWLETT-PACKARD DEVELOPMENT COMPANY, L.P., Houston, TX (US)

(72) Inventor: Hans F. Valine, Clermont, FL (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,903

(22) Filed: Oct. 27, 2015

(65) Prior Publication Data

US 2016/0050207 A1    Feb. 18, 2016

Related U.S. Application Data

(63) Continuation of application No. 11/612,775, filed on Dec. 19, 2006, now Pat. No. 9,191,989.

(51) Int. Cl.
*H04L 12/28* (2006.01)
*H04L 29/06* (2006.01)
*H04W 88/06* (2009.01)
*H04W 84/12* (2009.01)

(52) U.S. Cl.
CPC .......... *H04L 63/10* (2013.01); *H04L 12/2801* (2013.01); *H04L 69/14* (2013.01); *H04W 88/06* (2013.01); *H04W 84/12* (2013.01)

(58) Field of Classification Search
CPC .............................. H04W 88/06; H04L 12/28
See application file for complete search history.

(56) References Cited

U.S. PATENT DOCUMENTS

| | | | |
|---|---|---|---|
| 5,638,517 A | 6/1997 | Bartek et al. | |
| 5,991,292 A | 11/1999 | Focsaneanu et al. | |
| 6,275,874 B1 * | 8/2001 | Wilson | H04L 29/06 709/223 |
| 6,389,005 B1 * | 5/2002 | Cruickshank | H04L 12/2856 370/352 |
| 6,782,429 B1 | 8/2004 | Kisor | |
| 7,127,245 B2 | 10/2006 | Almgren | |

(Continued)

FOREIGN PATENT DOCUMENTS

| | | |
|---|---|---|
| WO | WO-9930478 A1 | 6/1999 |
| WO | WO-0247412 A1 | 6/2002 |

*Primary Examiner* — Wei Zhao
(74) *Attorney, Agent, or Firm* — Mahamedi Paradice LLP

(57) ABSTRACT

A computer device can include a plurality of network adapters each operable to connect the computer device with a network, such as a private wired local area network (LAN) or a wireless local area network (WLAN). The computer device can include a controller to detect and select a first network of the plurality of networks. The controller can further enable a first network adapter of computer device to connect the computer device with the first network. In response to enabling the first network adapter, the controller can disable the other network adapter(s) to prevent connectivity with the other network(s).

20 Claims, 3 Drawing Sheets

(56) References Cited

U.S. PATENT DOCUMENTS

| | | | |
|---|---|---|---|
| 7,627,097 B2 * | 12/2009 | Kawabata | H04M 1/2535 |
| | | | 358/400 |
| 2003/0053446 A1 | 3/2003 | Kwon | |
| 2003/0054818 A1 | 3/2003 | Bahl et al. | |
| 2003/0221034 A1 | 11/2003 | Cheng | |
| 2005/0265284 A1 | 12/2005 | Hsu et al. | |
| 2006/0050240 A1 | 3/2006 | Castaldi et al. | |
| 2006/0203835 A1 | 9/2006 | Bernstein et al. | |
| 2008/0298275 A1 | 12/2008 | De Sousa | |

* cited by examiner

APPARATUS, AND ASSOCIATED METHOD, FOR CONTROLLING CONNECTIVITY OF A COMPUTER DEVICE WITH A COMPUTER NETWORK

CROSS REFERENCE TO RELATED APPLICATION

This application is a Continuation of U.S. patent application Ser. No. 11/612,775, filed Dec. 19, 2006, now U.S. Pat. No. 9,191,989, entitled "APPARATUS, AND ASSOCIATED METHOD, FOR CONTROLLING CONNECTIVITY OF A COMPUTER DEVICE WITH A COMPUTER NETWORK," which is hereby incorporated by reference in its entirety.

BACKGROUND

The present invention relates generally to a manner by which to control communication connectivity of a computer device with a selected network of two or more networks with which the computer device is positionable in communication connectivity. More particularly, the present invention relates to apparatus, and an associated method, by which to permit communication connectivity of the computer device with the selected network and to prohibit concurrent communication connectivity of the computer device with any non-selected network.

Security problems that might arise as a result of concurrent connection of the computer device with two different networks is prevented. A computer device is, for example, prohibited from being concurrently connected to both the local area network of a business, or other, enterprise and an external, wireless local area network. Enabling, and disabling of, communication connections with the respective networks is carried out automatically responsive to user selection of with which of the networks to have the communication connectivity. Inadvertent, concurrent connection of the computer device with more than one network does not occur.

The use of computer devices, such as personal computers, is commonplace in modern society. Computer devices are used both in the workplace to perform business functions and also in the home, or elsewhere, for other purposes. As processing and storage capacities of such computer devices increase, the prevalence and use of such computer devices is likely also to increase.

Portable computers, and other computer work stations, are regularly connectable in network configurations, thereby to permit data to be communicated between separate ones of the computer devices. Standardized protocols have been promulgated, such as various of the IEEE 802 family of standards, to provide a standard scheme by which to communicate the data by which to communicate the data between the separate computer devices. By formatting the data pursuant to the standard protocols, and constructing the computer devices to format the data in such manner and to operate upon received data formatted in such manner, the informational content of data communicated between the different computer devices is readily recoverable.

So-called, local area networks (LANs) are a common configuration of connected together computer devices between which data can be communicated. The computers of many businesses and other enterprises are connected to form a local area network to permit data to be communicated between the computers of the network. Data stored at a LAN-connected computer server is also accessible by other computer connected to the local area network. And, groups of local area networks are sometimes interconnected, forming a wide area network, or otherwise permitting the computers of the interconnected local area networks to communicate with one another.

Network connections are sometimes provided by a public network, such as the Internet. Even when interconnected by way of a public data network, the communications between computer devices can be secured, such as through formation of a virtual private network (VPN).

And, so-called, wireless local area networks (WLANs) are also formable to provide communication connectivity between computer devices. In a wireless local area network, the computer device is connected to the network by way of wireless, that is, radio, connection rather than a wired connection. Free of the need to provide and maintain a wired connection, communication mobility is facilitated. That is to say, the computer device is not limited to its positioning in proximity to a wired connection but, rather, is positionable at any location within radio range of a transceiver that forms part of the network of a wireless local area network.

In whatsoever type of arrangement, i.e., a wireless local area network or a wired local area network, a computer device must contain a mechanism permitting communication connectivity with the network. Typically, a network connector card, sometimes referred to as an adapter card, is used to provide the communication connectivity. And, a typical portable computer, or laptop computer, is configurable to include more than one network adapter. For instance, a portable computer might well include an adapter card permitting connection of the computer device with a local area network and an additional adapter card permitting connection of the computer device with a wireless local area network. If desired, more than two adapter cards are configurable at the computer device to provide additional network connectivity.

When so-configured, the computer device is placeable in communication connectivity with two or more networks. And, such communication connectivity might be concurrent. There are some situations, however, in which it might not be desirable to permit such concurrent connectivity. For instance, for reasons of security, it might be desirable not to permit such concurrent connectivity. When, for instance, a computer device is connected to the local area network of a business, or other, enterprise, the operator of the network might well want to prohibit the concurrent connection of the computer device to another network, such as a wireless local area network operated by another entity or operator. To preclude such occurrence, the operator of the local area network most simply prohibits connection of the computer device to the local area network if the computer device has capability of connection to another network. Such a prohibition is, however, oftentimes unwieldy. Connection to the network is sometimes, e.g., due to this constraint, limited to computer devices provided by, or approved by, the operator of the network.

There is a need, therefore, to provide an improved manner by which to control communication connectivity of a computer device with a network.

It is light of this background information related to computer devices connectable to a network that the significant improvements of the present invention have evolved.

SUMMARY OF THE DISCLOSURE

The present invention, accordingly, advantageously provides apparatus, and an associated method, by which to control communication connectivity of a computer device with a selected network of two or more networks with which the computer device is positionable in communication connectivity.

Through operation of an embodiment of the present invention, a manner is provided by which to permit communication connectivity of the computer device with the selected network and to prohibit concurrent communication connectivity of the computer device with any non-selected network.

In one aspect of the present invention, security problems that might arise as a result of concurrent connection of the communication device with two different networks is prevented. A computer device that is configured with mechanisms permitting its connection to two or more networks, such as a local area network and a wireless local area network, is permitted communication connectivity, at any particular time, to only one of the networks. Concurrent communication connectivity with more than one network is thereby prevented.

In another aspect of the present invention, selection is made of which, if any, of the networks is to be in communication connectivity with the computer device. The selection is determinative of which one of the networks, if any, that the computer device is placed into the communication connectivity. Through selection of a network to be placed in the communication connectivity with the computer device, all other networks are prohibited from being placed in the communication connectivity with the computer device. Only upon removal of the computer device out of the communication connectivity with the selected network is the computer device permitted to be placed into communication connectivity with another network.

In another aspect of the present invention, selection of the selected network is made by a user of the computer device. The user is provided with a selection of the networks with which the computer device is placeable into communication connectivity. A selection menu displayed upon a display screen of a user interface of the computer device, for instance, is used to provide the user with the selection capability. The user is permitted to select, as a selected network, only one network at any time.

In another aspect of the present invention, a network adapter is provided at the computer device to provide, at least in part, the mechanism by which the communication connectivity with a network is provided. When two different networks are connectable, a first network adapter is provided for a first of the networks, and a second network adapter is included as part of the computing device to provide the mechanism by which to form the communication connectivity with the second network. When the first network forms a wireless local area network, the first network adapter comprises a wireless local area network card. And, when the second network forms a local area network, the network adapter forms a local area network adapter card. Selection is made as to which of the cards, the network adapter card or the wireless network adapter card, is to be used to place the computer device into the communication connectivity with the selected one of the networks. Only one of the network adapter cards is useable during any particular period by which to place the computer device in communication connectivity with a network. And, hence, only one network is placeable in the communication connectivity with the computer device at any particular time.

In another aspect of the present invention, a controller controls the network adapters and their use to form the communication connectivity with the selected network. The controller is operable responsive to the selection of the selected network, such as by user selection of the selected network. User selection is made, e.g., by selection entered responsive to display of the network selections on a display screen of the selectable networks.

In another aspect of the present invention, the controller includes an application program executable at the computer device. The application program is installed at the computer device, such as by the running of a setup.exe program. Once installed, the application, when executed, prompts a user of the computer device to select the network with which communication connectivity is to be provided. The prompt forms, for instance, a drop down list that displays the available adapters on the computer device. The program starts automatically, once installed, and further operates to monitor the status of the adapters. Once installed, the service provided the by the application cannot be stopped by the user. That is to say, its operation to permit communication connectivity of the computer device with one, but not more than one, network at any time cannot be defeated by the user.

In another aspect of the present invention, the controller causes the adapter associated with the selected network to be enabled. When the selected network forms a wireless local area network, the adapter associated therewith is enabled and the other adapter, a local access network adapter, is automatically disabled to prevent communication connectivity therewith. When the user deactivates the connection with the selected network when the selected network forms the wireless network, the controller causes the adapter associated therewith to be disabled and also to enable the adapter associated with the local area network. Thereby, when the wireless network is not placed in the communication connectivity with the computer device, the wired, local area network forms the default network with which the computer device is maintained in the communication connectivity.

Thereby a manner is provided by which to provide for communication connectivity of a computer device with a selected network. Only one, not more than one, network, is connectable to the computer device in the communication connectivity at any particular time.

In these and other aspects, therefore, apparatus, and an associated method, is provided for a computer device capable of communication connectivity with a first network and with a second network. A selector is adapted to receive indication of with which, if any, of the first network and the second network is to form a selected network to which the computer device is to be placed in the communication connectivity. A controller is operable responsive to selection made at the selector of which, if any, of the first and second networks that the computer device is to be placed in the communication connectivity. The controller is configured to enable the communication connectivity with the selected network and to prevent communication connectivity with a non-selected network while the communication connectivity is enabled with the selected network.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
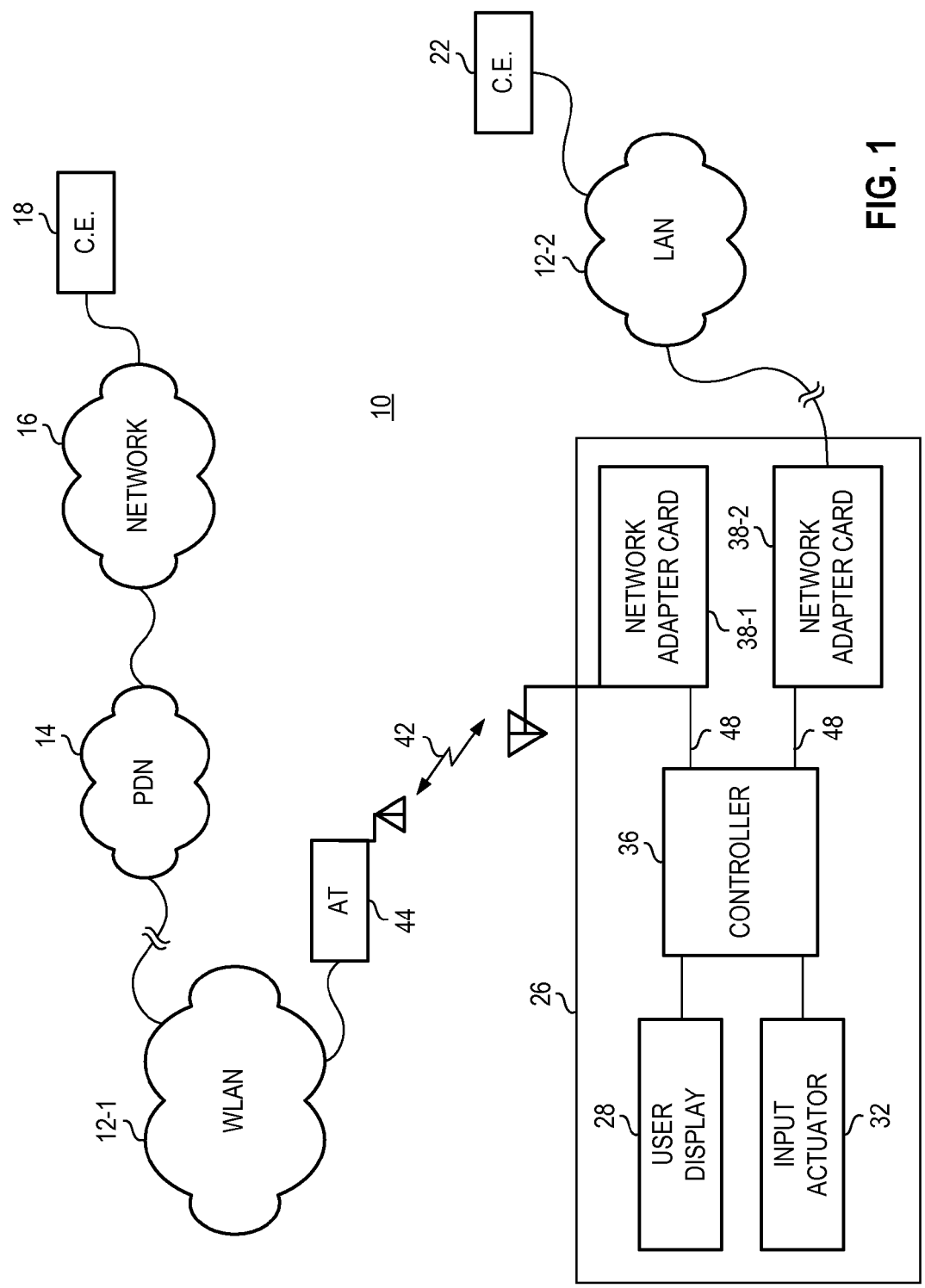
FIG. 1 illustrates a functional block diagram of an arrangement of communication networks together with a computer device operable pursuant to an embodiment of the present invention.

Referring first to FIG. 1, a communication arrangement, shown generally a 10, includes a plurality of networks 12, of which two networks, a network 12-1 and a network 12-2 are shown in the Figure. In other arrangements, greater numbers of networks are provided. In the exemplary implementation shown in FIG. 1, the network 12-1 forms a wireless local area network (WLAN), and the network 12-2 forms a wired, local area network (LAN). The networks are exemplary, and in other implementations, the networks 12 are of other configurations.

In the exemplary implementation shown in FIG. 1, the wireless local area network 12-1 is connected to a public, packet data network (PDN) 14, such as the Internet, that, in turn, is connected to another network 16. And to a communication endpoint (CE) 18 is coupled to the network 16. Data originated, or terminated, at the communication endpoint is routable through the networks in conventional manner.

The local area network 12-2 is representative of the local network of a business, or other, enterprise. The local area network 12-2 is typically formed of a plurality of computer devices, including a communication endpoint 22.

The arrangement further illustrates a computer device 26 that is connectable, that is, placeable in communication connectivity, with either of the networks 12-1 and 12-2. In the exemplary implementation, the computer device forms a laptop computer, or other portable, computing device of dimension and weight permitting its carriage by a user. The computing device includes a user interface, here including a user display 28 and a user input actuator 32, such as a computer keyboard and a computer mouse.

The computer device further includes a controller 36, such as a core processor, or the like, of a portable computer. The controller invokes execution of applications during its operation. The controller 36 is multi-functional, that is, operable to control various facets of operation of the computer device, including causing display of user displays on the user display 28 and to accept, and operate upon, input actuations made by the user upon the input actuator 32.

The computer device further includes network adapters 38. Here, two network adapters 38-1 and 38-2 are shown. The network adapters are electrically coupled to the controller 36, as well as other elements (not shown) of the computer device. Here, the adapter 38-1 forms a wireless local area network card, and the adapter 38-2 comprises a wired network adapter card. When operable, the respective network adapters place the computer device 26 in communication connectivity with the associated network. That is to say, when the adapter card 38-1 is operable, the computing device is placeable in communication connectivity, here by way of a radio air interface 42, with a transceiver station, here represented as an access terminal (AT) 44. And, when the network card 38-2 is operable, the computer device 26 is positionable in communication connectivity with the network 12-2.

As mentioned previously, for security purposes, it is sometimes desired to not permit the computer device to be in communication connectivity with more than one network at a time. For instance, when the network 12-2 forms a private, limited-access network, such as a business enterprise network, security motivations prohibit the simultaneous connection of the computer device with both the network 12-2 and any other network, such as the WLAN 12-1. Pursuant to an embodiment of the present invention, a mechanism is provided by which to provide for connection of the computer device to one network, and not more than one network during any time period. By controlling the communication connectivity of the computer device, security, and other, concerns related to the concurrent connection of the computer device to more than one network are avoided.

The controller 36 is operable, responsive to selection of a selected network with which the computer device is to be positioned in the communication connectivity to enable the adapter 38 associated with the selected network. Lines 48 extending to the respective adapters provide for the enablement of the selected adapter. When one of the adapters is enabled, no other adapter is enabled. Control exerted by the controller ensures enablement of only one of the adapters and communication connectivity with only one of the networks at a time.

In the exemplary implementation, selection is user-made. When the computer device is to be placed in communication connectivity with a network, the user selects the selected network through interaction with the user interface of the computer device. In the exemplary implementation, a menu selection, such as a drop down menu selection is displayed on the user display of the user interface. And, the user makes selection through positioning of a cursor indicator, in conventional manner, at the display of the appropriate network, and makes selection of the network with which the computer device shall be placed in the communication connectivity.

In the exemplary implementation in which the adapter 38-1 forms a wireless network card and the adapter 38-2 forms a wired network card, selection of the wireless network causes the wireless network card 38-1 to be enabled and the wired network card to be disabled. The enabling of the wireless network card occurs when the user activates connections via the wireless network card.

Subsequently, if decision is made no longer to maintain the communication connectivity with the wireless network, the connection is deactivated by way of wireless network software, and the wireless adapter is disabled. And, the wired, local area network is enabled so that the computer device is placed in communication connectivity with the wired, local area network. In the exemplary implementation, the process of enabling and disabling network adapters occurs quickly, e.g., within one second of the actual, triggered event.

Figure 2:
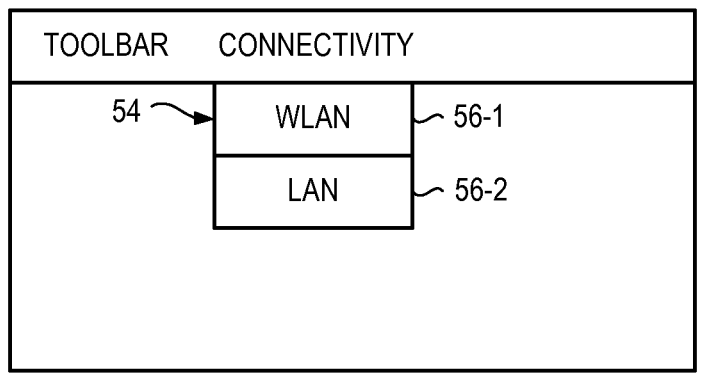
FIG. 2 illustrates an exemplary screen display generated pursuant to operation of an embodiment of the present invention.

FIG. 2 illustrates an exemplary, menu display displayable upon the user display 28 of the computer device 26, shown in FIG. 1. Here, the display menu forms a drop down menu 54, including network selection options 56, corresponding in number with the networks with which the computer device is placeable in the communication connectivity. In the exemplary implementation in which the computer device is configured to be connectable to a wired network and to a wireless network, such as the networks 12-1 and 12-2, shown in FIG. 1, the drop down menu includes two menu selections, selection 56-1 and selection 56-2. To make selection of a selected network with which to cause the computer device to be placed in the communication connectivity, the user positions a cursor, or otherwise in conventional manner, selects a selected one of the menu selections to be the selected network. In an implementation having greater numbers of networks that are selectable, a corresponding greater number of menu selections are correspondingly provided. In other implementations, other graphical user interfaces, or other user interfaces, are utilized.

Figure 3:
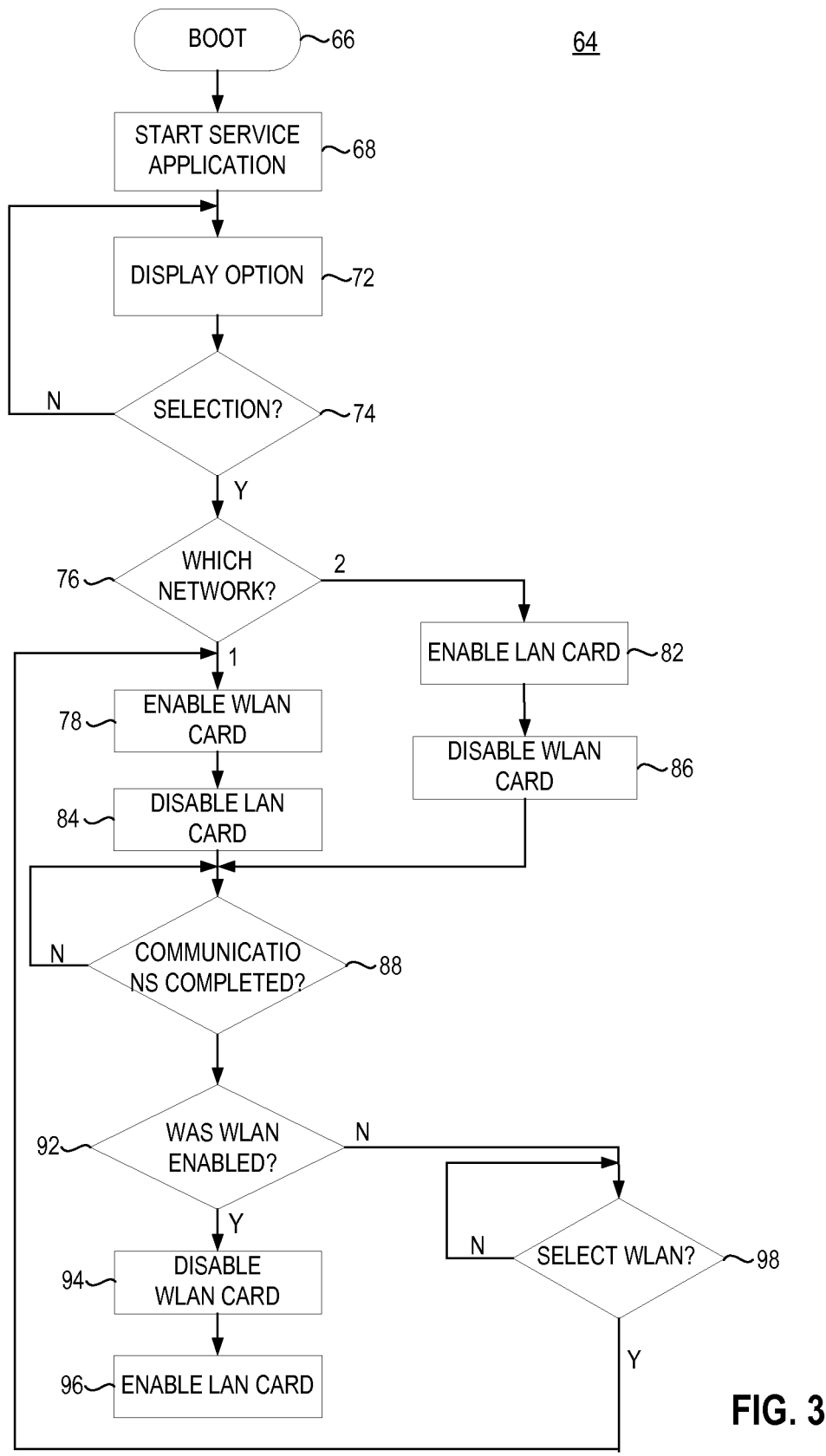
FIG. 3 illustrates a process diagram representative of the process of operation of an embodiment all the present invention.

FIG. 3 illustrates a process diagram, shown generally 64, of the process of operation of an exemplary embodiment of the present invention. The process includes operation of a service application that is installed at a computer device, such as through the running of a setup.exe application. Once installed, the service application is executable automatically and operates, amongst other things, to monitor the status of adapters that provide for communication connectivity with a selected network.

The process starts upon booting, indicated by the block 66, of the computer device at which the application is installed. That is to say, subsequent to the booting of the computer device, the service application is started, indicated by the block 68. Then, and as indicated by the block 72, the options are displayed. The networks available to form the selected network with which the computer device is placeable in communication connectivity are displayed to permit a user to select therefrom.

Then, and as indicated by the decision block 74, a determination is made as to whether the user makes a selection. If not, the no branch is taken back to the block 72. Otherwise, the yes branch is taken to the decision block 76. At the decision block 76, a determination is made, here of which of the two available networks that the user has selected. If the user selects the first, here the wireless, network, a first branch is taken to the block 78. At the block 78, the WLAN card is enabled. If, conversely, the second, here the wired network, network is selected, the second branch is taken to the block 82. And, at the block 82, the wired local area network card is enabled. As indicated by the blocks 84 and 86, the card associated with the non-selected network is disabled. That is to say, if the WLAN card is enabled, block 84 indicates that the wired network card is disabled. And, if the wired network card is enabled, as indicated by the block 82, the WLAN card is disabled, indicated by the block 86.

Subsequently, and as indicated by the decision block 88, a determination is made as to whether communications have been completed. If not, the no branch is taken back to the decision block. Otherwise, the yes branch is taken to the decision block 92. At the decision block 92, a determination is made as to whether it was the wireless network card that was enabled. If so, the yes branch is taken to the block 94, and the wireless network card is disabled. Then, and as indicated by the block 96, the wired network card is enabled. If, conversely, the wired network card is determined to have been enabled, the no branch is taken from the decision block 92 to the decision 98. At the decision block 98, a determination is made whether the user has selected to cause the computer device to enter into communication connectivity with the wireless network. If not, the no branch is taken back to the decision block. Otherwise, the yes branch is taken to the block 82.

Thereby, only one network is connected in communication connectivity with the computer device at which the service application is operable. Concurrent connectivity of the computer device with more than one network is prevented.

Figure 4:
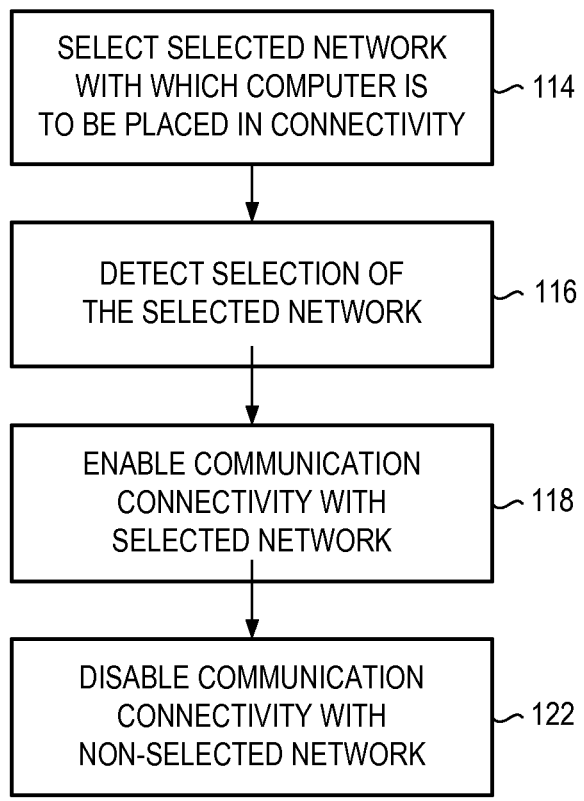
FIG. 4 illustrates a method flow diagram listing the operations of the method of an embodiment of the present invention.

FIG. 4 illustrates a method flow diagram, shown generally at 112, representative of the method of operation of an embodiment of the present invention. The method provides selectable communication connectivity of a computer device with a first network and with a second network. First, and as indicated by the block 114, a selected network with which the computer device is to be placed in communication connectivity is selected. Then, and as indicated by the block 116, the selection of which of the networks is to form a selected network is detected.

Then, and as indicated by the block 118, the communication connectivity is enabled with the selected network while preventing communication connectivity with a non-selected network while the communication connectivity with the selected network is enabled. The block 122 represents the operation of disabling communication connectivity with the nonselected network.

Because only one network is placeable in the communication connectivity with the computer device at any particular time, security, and other, concerns related to concurrent placement of more than one network in communication connectivity with the computer device are obviated.

The previous descriptions are of preferred examples for implementing the invention, and the scope of the invention should not necessarily be limited by this description. The scope of the present invention is defined by the following claims.

What is claimed is:

1. A computer device comprising:
a plurality of network adapters, each of the plurality of network adapters to connect the computer device with a corresponding one of a plurality of networks; and
a controller to (i) detect and select a first network of the plurality of networks, (ii) enable a first network adapter of the plurality of network adapters to connect the computer device with the first network, and (iii) in response to enabling the first network adapter, disable at least one other network adapter, of the plurality network adapters, to prevent connectivity with at least one other network of the plurality of networks.

2. The computer device of claim 1, wherein the first network adapter comprises a wireless local area network (WLAN) adapter, and wherein the first network comprises a wireless network.

3. The computer device of claim 2, wherein the at least one other network adapter comprises a local area network (LAN) adapter to connect the computer device to a private LAN.

4. The computer device of claim 3, wherein the LAN adapter comprises a wired LAN adapter.

5. The computer device of claim 3, wherein the private LAN comprises an enterprise network, and wherein disabling the LAN adapter by the controller prevents access to the enterprise network via the WLAN.

6. The computer device of claim 3, wherein the controller is further to enable the LAN adapter upon disabling the WLAN adapter.

7. The computer device of claim 1, wherein the controller comprises a core processor.

8. A method of controlling connectivity of a computer device with a plurality of networks, the method being performed by a controller of the computer device and comprising:
detecting and selecting a first network of the plurality of networks;

enabling a first network adapter of a plurality of network adapters of the computer device, to connect the computer device with the first network; and in response to enabling the first network adapter, disabling at least one other network adapter, of the plurality network adapters, to prevent connectivity with at least one other network of the plurality of networks.

9. The method of claim 8, wherein the first network adapter comprises a wireless local area network (WLAN) adapter, and wherein the first network comprises a wireless network.

10. The method of claim 9, wherein the at least one other network adapter comprises a local area network (LAN) adapter to connect the computer device to a private LAN.

11. The method of claim 10, wherein the LAN adapter comprises a wired LAN adapter.

12. The method of claim 10, wherein the private LAN comprises an enterprise network, and wherein disabling the LAN adapter by the controller prevents access to the enterprise network via the WLAN.

13. The method of claim 10, further comprising enabling the LAN adapter upon disabling the WLAN adapter.

14. The method of claim 8, wherein the controller comprises a core processor.

15. An apparatus for controlling communication connectivity of a computer device with a plurality of networks, the apparatus comprising:

a controller to (i) detect and select a first network of the plurality of networks, (ii) enable a first network adapter, of a plurality of network adapters of the computer device, to connect the computer device with the first network, and (iii) in response to enabling the first network adapter, disable at least one other network adapter, of the plurality network adapters, to prevent connectivity with at least one other network of the plurality of networks.

16. The apparatus of claim 15, wherein the first network adapter comprises a wireless local area network (WLAN) adapter, and wherein the first network comprises a wireless network.

17. The apparatus of claim 16, wherein the at least one other network adapter comprises a local area network (LAN) adapter to connect the computer device to a private LAN.

18. The apparatus of claim 17, wherein the LAN adapter comprises a wired LAN adapter.

19. The apparatus of claim 17, wherein the private LAN comprises an enterprise network, and wherein disabling the LAN adapter by the controller prevents access to the enterprise network via the WLAN.

20. The apparatus of claim 17, wherein the controller is further to enable the LAN adapter upon disabling the WLAN adapter.

* * * * *